United States Patent [19]

Bouwhuis

[11] 3,956,582

[45] May 11, 1976

[54] APPARATUS FOR READING A RECORD CARRIER ON WHICH INFORMATION IS RECORDED IN AT LEAST ONE TRACK

[75] Inventor: Gijsbertus Bouwhuis, Eindhoven, Netherlands

[73] Assignee: U.S. Philips Corporation, New York, N.Y.

[22] Filed: Dec. 24, 1974

[21] Appl. No.: 536,161

Related U.S. Application Data

[63] Continuation of Ser. No. 344,866, March 26, 1973, abandoned.

[30] Foreign Application Priority Data

Sept. 5, 1972 Netherlands...................... 7212044

[52] U.S. Cl. ...................... 178/6.6 R; 178/6.6 DD; 178/6.7 A; 179/100.3 V; 179/100.41 L
[51] Int. Cl.² ........................................ H04N 5/76
[58] Field of Search ............ 179/100.3 V, 100.3 Z, 179/100.41 L, 100.3 N, 100.3 M, 100.3 G, 100.3 B, 100.3 D, 100.4 R; 178/6.6 R, 6.6 DD, 6.7 A; 340/173 LM

[56] References Cited
UNITED STATES PATENTS

| | | | |
|---|---|---|---|
| 3,534,166 | 10/1970 | Korpel | 179/100.3 V |
| 3,567,855 | 3/1971 | Hamish | 179/100.3 Z |
| 3,688,025 | 8/1972 | Whittlemore | 179/100.3 G |

*Primary Examiner*—Raymond F. Cardillo, Jr.
*Attorney, Agent, or Firm*—Frank R. Trifari; Simon L. Cohen

[57] ABSTRACT

An apparatus for reading a record carrier on which information is recorded in at least one track is described. By illuminating the record carrier with a spot of light which is greater than the width of the track and by inserting in the path of the radiation from the record carrier to the detection system a limiting aperture such that at the wavelength of the radiation employed no details smaller than the width of the track are imaged on the detection system a simple and cheap arrangement may be used.

2 Claims, 3 Drawing Figures

APPARATUS FOR READING A RECORD CARRIER ON WHICH INFORMATION IS RECORDED IN AT LEAST ONE TRACK

This is a continuation of application Ser. No. 344,866 filed Mar. 26, 1973 now abandoned.

The invention relates to an apparatus for reading a record carrier on which information, for example video and/or audio information, is recorded in at least one track, which apparatus comprises a source of radiation and a radiation-sensitive detection system for converting the read beam emitted by the radiation source and modulated by the record carrier into an electric signal. The term "substantially concentric tracks" as used herein shall include the adjacent track areas of a spiral track. It has already been proposed to build up the track from regions of vaiable lengths separated by areas. The information may be recorded in the form of a phase structure or in the form of an amplitude structure, which means that the phase or the amplitude respectively of the read beam is modulated by this information structure.

It has also been proposed, for example in co-pending U.S. Pat. application Ser. No. 396,399 filed Sept. 12, 1973 which is a continuation of Ser. No. 229,285, filed Feb. 25, 1972, now abandoned, when reading such a structure, to image parts thereof having dimensions smaller than the smallest detail of the structure on the detection system. This may be achieved by projecting a very small spot of radiation onto the structure and imaging the irradiated part of the optical structure on the detection system. As an alternative, a larger spot of radiation may be projected onto the structure, only a very small portion of the irradiated part of this structure being imaged on the detection system. Because it is desirable for the amount of information stored on the record carrier to be large, the dimensions of the regions and areas may be very small. For example, if a video program of a duration of 45 minutes is to be recorded on a circular record carrier having an outer diameter of 30 cm, the blocks and areas may have dimensions of the order of 1 μm. This means that for the two aforementioned reading methods a lens having a large numerical aperature is to be used, for the smallest detail which a lens can image is proportional to the wavelength of the radiation used divided by the numerical aperture of the lens. The numerical aperture N.A. of a lens having a circular entrance pupil is given by:

$$N.A. = \sin u,$$

where $u$ is one half of the angle subtended by the object at the eye of the observer.

A lens having a large numerical aperture is expensive. In addition, because the depth of focus of a lens is proportional to the wavelength of the light employed divided by the square of the numerical aperture, such a lens will have a small depth of focus.

It is an object of the invention to avoid in a read apparatus of the type described at the beginning of this specification the use of a lens having a large numerical aperture and the associated difficulties. The apparatus according to the invention moreover is eminently suitable for reading a record carrier in which the information is stored in the form of phase structure. In addition, the apparatus may be simple and inexpensive. Reading requires not the expensive and complicated phase contrast arrangements or interferometric arrangements used in known apparatuses. The apparatus according to the invention is characterized in that the dimension of the cross-sectional area of the read beam in the direction of width of the track at the location of the record carrier is greater than the width of the track, and, if a plurality of tracks are provided, is smaller than the sum of the track width plus twice the width of the informationless intermediate stripes, and in that in the path of the radiation from the record carrier to the detection system a limiting aperture is inserted such that a considerable part of the radiation diffracted by the information recorded on the record carrier falls outside the detection system. The term "dimension of the cross-sectional area of the read beam" is to be understood to mean the distance between two points in this cross-sectional area at which the radiation intensity has decreased to the $(e^{-2})$th part of the intensity at the center of the beam. In the case of a circular read beam the dimension of the cross-sectional area of the read beam in the direction of width of the track is equal to the diameter of the read beam.

In the apparatus according to the invention the imaging system is used in a manner different from that commonly used hitherto. Whereas in known read apparatuses a lens having the highest possible resolving power is used, in the apparatus according to the invention a lens having small resolving power is intentionally chosen.

An apparatus according to the invention may advantageously be used for reading a reflecting record carrier. For this purpose such an apparatus is characterized in that the limiting aperture is also arranged in the path of the radiation from the radiation source to the record carrier. The term "reflecting record carrier" is to be understood to mean a record carrier in which the information is recorded in a reflecting structure.

An embodiment of the invention will now be described, by way of example, with reference to the accompanying diagrammatic drawings, in which.

Figure 1:
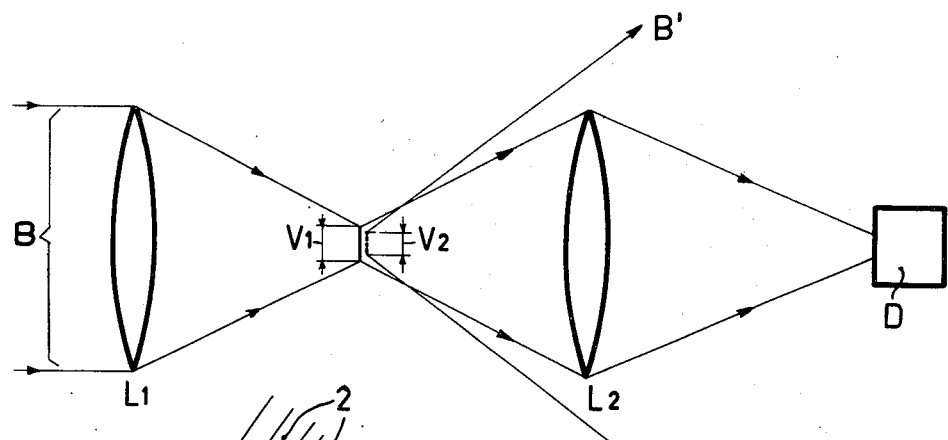
FIG. 1 illustrates the principle of the apparatus according to the invention.

Firstly, the theoretical background of the invention will be explained. Consider a lens $L_1$ which is irradiated by a parallel beam B, that fills the entire pupil of the lens (FIG. 1). The lens will concentrate the radiation into a spot $V_1$ in the back focal plane of the lens. The dimension of this spot is the theoretical minimum for this lens and is determined by the diffraction at the lens aperture. The minimum dimension of the spot is given by $$V_{1min} = C \cdot \frac{\lambda}{N.A.}$$

wherein $\lambda$ is the wavelength of the radiation employed and N.A. the numerical aperture of the lens, while c is a constant of the order of 1 which is determined by the intensity distribution across the read beam, said distribution being for example Gaussian when a laser source is used. The dimension of the spot $V_1$ is also the dimension of the smallest object that can be imaged by a lens $L_2$ with the same numerical aperture as lens $L_1$.

When illuminating an object $V_2$ with a beam the cross section of which is greater than the dimensions of the object, the radiation of the beam will be diffracted. Besides a zero-order beam also two first order beams (+1), (−1) (B' in FIG. 1), two second order beams (+2), (−2) etc. will occur. The zero order beam per se does not carry information about the object, this information is distributed over the beams of higher order. If the pupil of the lens $L_2$ would be great enough, the beams of all diffraction orders will pass through the lens and by superposition of the beams in the image plane a faithful image of the object $V_2$ would be formed. If, however, the pupil of the lens is smaller the beams of some of the diffraction orders no longer will pass through the lens. In the image plane then not all diffraction orders are superposed, and a faithful image of the object $V_2$ is no longer formed.

The angles of diffraction are determined by the dimensions of the object; the smaller the object the greater are the angles of diffraction. If the object and the numerical aperture of the lens are small enough, only the zero-order beam will pass through the lens. In FIG. 1 the size of the light spot $V_1$ is greater than that of the object $V_2$, and the lenses $L_1$ and $L_2$ have the same numerical aperture. So each diffracted beam will fall outside the lens aperture and only the zero-order beam will reach a detector D, arranged in the image plane of the lens $L_2$. The intensity of the zero-order beam is considerably smaller than the intensity of a beam with the cross section of $V_1$ that would not be diffracted by the object $V_2$. So, by determining the intensity of the radiation onto the detector, it can be ascertained whether or not the spot $V_1$ is projected onto an object $V_2$.

According to the invention an arrangement as shown in FIG. 1 may be used for reading a record carrier in transmission. For this purpose the record carrier is positioned so that the track to be read lies in the plane of the detail $V_2$. The record carrier is moved so that the successive parts of the track sequentially appear at the location of $V_2$.

Figure 2:
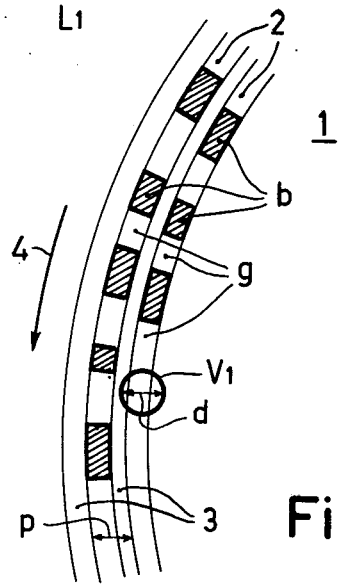
FIG. 2 shows part of the optical structure of the record carrier to be read.

FIG. 2 shows part of the optical structure of a record carrier to be read, in this case a circular record carrier. A plurality of blocks $b$ are arranged according to tracks 2 on a record carrier 1. A beam of radiation incident on the record carrier is influenced by the blocks in another manner than by the remainder of the record carrier, i.e. by the areas $g$ situated between the blocks and by the informationless intermediate stripes 3. The tracks may be arranged parallel to one another, i.e. so as to be concentric about the center of the record carrier. Alternatively a continuous spiral track may be provided on the record carrier. The lengths of the regions and the spacings between the regions are determined by the information stored in the track.

A beam of radiation, not shown, for example the beam B of FIG. 1, forms a spot of radiation $V_1$ on the optical structure. Movement of the record carrier in the direction indicated by an arrow 4 causes the radiation beam to be modulated in time in accordance with the sequence of regions and areas in a track. The diameter $d$ of the spot of light $V_1$ is greater than the width of the tracks 2, but smaller than the sum of the track width plus twice the width of the informationless intermediate stripes.

The numerical aperture of the lens which is to form an image of the record carrier on the detection system is chosen so that this lens can no longer image the narrow regions $b$. Thus the detector D (FIG. 1) will receive the radiation intensity present in the spot $V_1$ as long as this spot does not impinge on a region $b$. When the radiation spot is projected onto a region $b$, with a width smaller than the diameter of the spot, a comparatively large amount of radiation is diffracted outside the entrance pupil of the lens $L_2$. Then the radiation intensity onto the detector decreases considerably. Thus, when the spot of radiation is over an informationless area the output of the detection is maximum, but when the beam intersects a region, the higher spatial frequency of the detail illuminated diffracts the light outside the aperture of the lens and the detection output drops to a minimum.

The information may be stored in the record carrier in the form of an amplitude structure, the blocks being coplanar with the surface of the record carrier. In this embodiment the blocks may be radiation-absorbing, while the record carrier may be either radiation-transmitting or radiation reflecting. By illuminating an absorbing area with a spot, the diameter of which is greater than the width of this area, and by using a lens with a small enough numerical aperture, part of the radiation will be diffracted outside the lens aperture. The intensity of the zero-order beam, which beam passes through the lens is partly blocked due to the absorption of said regions. So the effects of diffraction and absorption will add, and only very little radiation will reach the detector if a spot is projected onto an absorbing region. If a diffraction mechanism were not to be used, but the spot would be imaged at the detector (as in the prior art apparatus), the spot should be smaller than the regions for an optimum modulation of the read-out signal. As already remarked, for such a spot a lens with a great numerical aperture is needed. If a spot greater than the width of the regions is used together with a lens between the record carrier and the detector with such a numerical aperture that it always concentrates all of the radiation onto the detector, the regions will block only a part of the read beam, and the modulation of the read-out signal is not deep enough. Alternatively, the plane of the regions may be slightly spaced from the surface of the record carrier. An example of such a phase structure is a reflecting record carrier in which pits have been pressed at the locations of the blocks, which pits lie a distance of ¼ λ beneath the surface of the record carrier. The pits need not have straight walls. A record carrier in which the surface merges smoothly into the bottom of each pit can also be read by means of an apparatus according to the invention.

Figure 3:
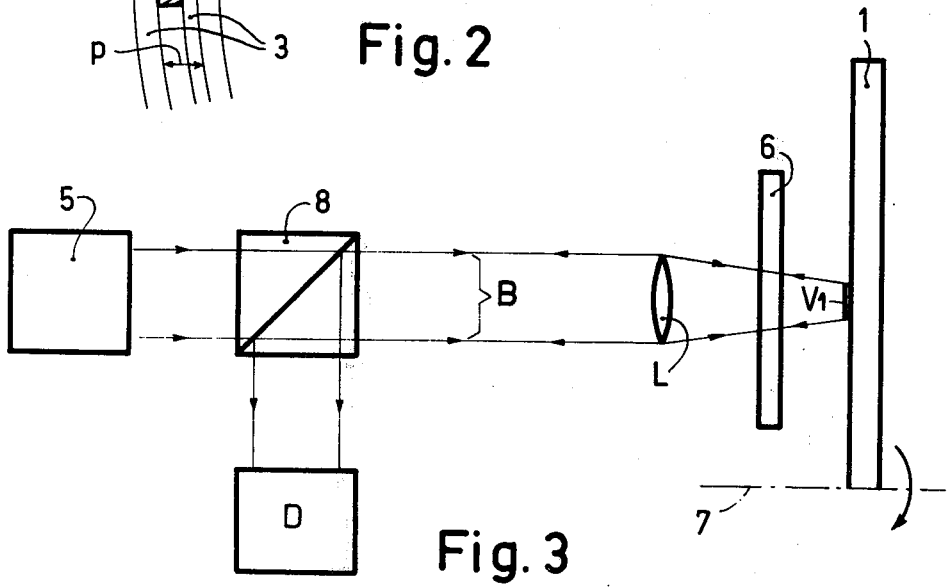
FIG. 3 shows an embodiment of an apparatus according to the invention for reading a reflecting record carrier.

FIG. 3 shows an apparatus according to the invention for reading a reflecting pit structure. A beam of radiation B incident on the lens L is focussed into a spot of radiation $V_1$ on a record carrier 1. The circular record carrier can rotate about an axis 7. The record carrier reflects the radiation to the lens L. As long as the spot of radiation $V_1$ is not projected onto a depression, the reflected radiation will pass through the lens L and be reflected by a beam-splitting prism 8 to a radiation-sensitive detector D. This will cause a signal to appear at the output of this detector. As soon as a radiation spot is projected onto a pit, on reflection the radiation will be diffracted so as to fall outside the pupil of the lens L. In this case the detector D receives little radiation and only a very small signal appears at the output of this detector. In this apparatus the functions of the lenses $L_1$ and $L_2$ of the apparatus shown in FIG. 1 are fulfilled by a single lens L.

The apparatus according to the invention is particularly suited for reading a phase structure as mentioned hereinbefore. By spacing the bottoms of the pits by a distance (¼) below the surface of the record carrier, the radiation reflected from the bottoms of the pits and that reflected from the record carrier surface will have a phase difference of 180°. When the diameter of the read beam and the intensity distribution within the beam are such that the same intensity will fall in the pits and outside the pits, the zero-order beam can be completely eliminated. Then no radiation will fall onto the detector when the read beam is incident on a region.

The read beam B is supplied by a laser source 5. To prevent radiation reflected at the record carrier from entering the laser cavity the beam-splitting prism 8 is a polarization-splitting prism. For example, it may transmit only radiation having a plane of polarization parallel to the plane of the drawing while reflecting radiation having a plane of polarization at right angles to the plane of the drawing. A λ/4 plate 6 is arranged in diagonal orientation between the lens L and the record carrier 1. This ensures that the plane of polarization of the radiation reflected to the prism is rotated through 90°, so that this radiation is reflected by the prism.

Hereinbefore a lens having a limited numerical aperture has been considered. Obviously, as an alternative the lens may be preceded by a separate aperture stop and have a larger numerical aperture, if this should be desired.

In a practical embodiment of an apparatus according to the invention a lens having a focal distance of 8 mm and a N.A. of 0.4 was irradiated by a laser beam emitted by a helium neon laser ( λ = 6328 A.U.) which has a Gaussian distribution with a diameter of 2.1 $\mu$m. The track period of the optical structure of the record carrier in the radial direction was 1.8 $\mu$m, and the smallest dimension in the track was 0.9 $\mu$m.

That the invention has been described with reference to a circular disc-shaped record carrier does not mean that the apparatus according to the invention should only be suitable for reading such a record carrier. Other record carriers, such as tape-shaped record carriers, can also be read by means of the apparatus described.

What is claimed is:

1. An apparatus for reading a record carrier of the type wherein video and audio information is recorded in the form of regions and areas of different optical properties then said regions in substantially concentric tracks, where the areas have substantially the same optical properties as the record carrier medium adjacent the tracks, the apparatus comprising a source of radiation, a radiation sensitive detector, and optical means for focussing the radiation onto a track of said record carrier as a spot of radiation having a width greater than the width of the track and smaller than the sum of the track width plus twice the distance between the track and the adjacent informationless areas between tracks, and for focussing the radiation from the tracks and from the informationless areas between tracks onto said radiation detector, the optical means including at least one lens in the path of the radiation from the tracks and having an aperture of a size sufficient to focus the radiation from the informationless areas of the record carrier on the radiation sensitive detector and insufficient to resolve the details of the regions, and wherein the radiation from the unrecorded carrier medium and from the areas between the regions is focussed on the radiation sensitive detector, and whereby the radiation from the regions is diffracted to a location outside the aperture of the lens and results in a decrease in the output of said detector.

2. Apparatus as claimed in claim 1, characterized in that said lens is also included in the path of the radiation from the radiation source to the record carrier.

* * * * *

UNITED STATES PATENT AND TRADEMARK OFFICE
CERTIFICATE OF CORRECTION

PATENT NO. : 3,956,582
DATED : May 11, 1976
INVENTOR(S) : GIJSBERTUS BOUWHUIS

It is certified that error appears in the above-identified patent and that said Letters Patent are hereby corrected as shown below:

IN THE SPECIFICATION

Col. 1, line 9, cancel "at least one" and insert --substantially concentric--;

line 10, "track" should be --tracks--;

Col. 3, line 66, "thelens" should be --the lens--;

Signed and Sealed this

Twenty-seventh Day of July 1976

[SEAL]

Attest:

RUTH C. MASON
Attesting Officer

C. MARSHALL DANN
Commissioner of Patents and Trademarks